United States Patent
Sundquist et al.

(10) Patent No.: US 7,301,919 B2
(45) Date of Patent: Nov. 27, 2007

(54) TRANSMISSION OF VOICE OVER IP IN WIRELESS TELECOMMUNICATIONS SYSTEM

(75) Inventors: Jaakko Sundquist, Tampere (FI); Peeter Pruuden, Helsinki (FI); Pekka Rissanen, Tampere (FI); Jani Ekman, Tampere (FI)

(73) Assignee: Nokia Corporation, Espoo (FI)

( * ) Notice: Subject to any disclaimer, the term of this patent is extended or adjusted under 35 U.S.C. 154(b) by 1012 days.

(21) Appl. No.: 10/305,389

(22) Filed: Nov. 27, 2002

(65) Prior Publication Data

US 2004/0203785 A1 Oct. 14, 2004

(51) Int. Cl.
*H04Q 7/00* (2006.01)
*H04Q 7/20* (2006.01)
*H04L 12/28* (2006.01)

(52) U.S. Cl. ............... 370/328; 370/331; 370/401; 455/436

(58) Field of Classification Search ............... 370/328, 370/331, 338, 401; 455/436–442
See application file for complete search history.

(56) References Cited

U.S. PATENT DOCUMENTS

| | | | | |
|---|---|---|---|---|
| 5,345,467 A | * | 9/1994 | Lomp et al. | 370/331 |
| 6,519,235 B1 | * | 2/2003 | Kim et al. | 370/331 |
| 6,658,253 B1 | * | 12/2003 | Berggren et al. | 455/444 |
| 6,668,170 B2 | * | 12/2003 | Costa et al. | 455/439 |
| 6,836,661 B2 | * | 12/2004 | Mohebbi | 455/437 |
| 6,876,634 B1 | * | 4/2005 | Lim | 370/310.1 |
| 6,888,803 B1 | * | 5/2005 | Gentry et al. | 370/259 |
| 6,889,046 B2 | * | 5/2005 | Mohebbi | 455/437 |
| 6,904,025 B1 | * | 6/2005 | Madour et al. | 370/328 |
| 6,993,359 B1 | * | 1/2006 | Nelakanti et al. | 455/554.1 |
| 2001/0046209 A1 | * | 11/2001 | Glassman | 370/230 |

(Continued)

FOREIGN PATENT DOCUMENTS

EP    1 047 279 A2    10/2000

(Continued)

OTHER PUBLICATIONS

VoIP Mobility in IP/cellular networks internetworking, Liao et al, IEEE Communications Magazine, pp. 70-75, Apr. 2000, vol. 38, Issue 4.

(Continued)

*Primary Examiner*—Wing Chan
*Assistant Examiner*—Hong Sol Cho
(74) *Attorney, Agent, or Firm*—Squire, Sanders & Dempsey L.L.P.

(57) ABSTRACT

A method of transmitting voice over IP (VoIP) in a wireless telecommunications system comprising at least one wireless mobile station, a first radio access gateway and a second radio access gateway. Address information of the second radio access gateway is defined in the first radio access gateway, if a need is detected to hand over the connection of the mobile station from a base station connected to the first radio access gateway to a base station connected to the second radio access gateway. Address information of the first radio access gateway is defined in the second radio access gateway. Data addressed to and transmitted from the mobile station is transferred through the first radio access gateway and the second radio access gateway when the handover has been performed to the base station connected to the second radio access gateway.

8 Claims, 3 Drawing Sheets

U.S. PATENT DOCUMENTS

2002/0065079 A1* 5/2002 Ekman et al. .............. 455/436
2003/0095542 A1* 5/2003 Chang et al. ............... 370/352

FOREIGN PATENT DOCUMENTS

| WO | WO 00/19750 | 4/2000 |
| WO | WO 00/28752 | 5/2000 |
| WO | WO 01/05122 A1 | 1/2001 |
| WO | WO 01/28185 A1 | 4/2001 |

OTHER PUBLICATIONS

The GSM System for Mobile Communications by M. Mouly, M-B Pautet, France 1992, ISBN 2-9507190-07.

* cited by examiner

TRANSMISSION OF VOICE OVER IP IN WIRELESS TELECOMMUNICATIONS SYSTEM

BACKGROUND OF THE INVENTION

The invention relates to the transmission of voice over IP (VoIP, Voice over Internet Protocol) in wireless telecommunications systems and especially to changing the radio access gateway managing the voice over IP connection in wireless telecommunications systems.

Voice over IP, i.e. speech transmission utilising the IP protocol, has received a great deal of notice during the last few years. H.323 is a standard defined by ITU (International Telecommunication Union) for packing the voice data and video image used in video conferencing programs and for call control, and it is one of the most important standards for implementing voice over IP. The H.323 standard specifies the transfer of packet-based multimedia information in systems which do not necessarily guarantee the quality of service (QoS). The H.323 standard can be applied to any IP-based (Internet Protocol) network, such as the Internet. H.323 can be used in both point-to-point calls and different point-to-multipoint applications. H.323 is a part of a larger collection of standards, the H.32X standards, which define conferencing standards for different network types. H.323 is designed to work with all H.32X recommendations.

Another standard used for voice over IP implementation is SIP (Session Initiation Protocol) developed by IETF (Internet Engineering Task Force). SIP is an application-level control protocol which allows the establishment, alteration and interruption of multimedia connections and voice over IP connections. The H.248/Megaco standard for gateways developed by ITU and IETF together can also be used in voice over IP implementation.

Radio access gateways (RAGW) are used in wireless telecommunications systems to transmit data between a wireless network and an IP-based network, i.e. to perform protocol conversion between a voice connection provided for wireless terminals and voice over IP in an IP network.

Current standards used in voice over IP do not themselves provide support for a handover of an active voice connection of a terminal. In this application, the term 'handover' refers to changing the radio traffic channel and responsibility from a source system to a target system in such a manner that a data transmission connection is maintained for the user's service. Handover can take place due to the moving of the terminal or for other reasons, such as for balancing the load between cells. One or more base stations are typically connected to radio access gateways, i.e. associated with them, the radio access gateways managing the voice connections of terminals in the areas of the base stations. If there is a need for a handover to a base station connected to a different radio access gateway, the radio access gateway transmitting data also needs to be changed.

Because every radio access gateway typically has its own IP address, changing the used radio access gateway would require changing the IP address at the sender end. This could be done by directing the media streams from the sender to a new radio access gateway and by excluding the old radio access gateway from the connection provision. A big problem with mobility support in standards used for voice over IP is that the apparatuses do not support any kind of signalling related to changing the termination point of the connection. Thus, the terminal of a second termination point cannot be configured during an active connection to use a new radio access gateway without a noticeable decrease in the speech quality during the handover. Voice over IP connections are typically arranged through firewalls which are quite problematic when the termination point is changed. Changing an active connection requires quick action from the firewall and understanding the signalling related to the handover, because the destination IP address may change during the call.

BRIEF DESCRIPTION OF THE INVENTION

It is thus an object of the invention to develop a new kind of arrangement for changing the radio access gateways managing voice over IP connections in a wireless telecommunications system. The object of the invention is achieved by a method, system according to the method, and network elements according to the method, which are characterized by what is stated in the independent claims. Preferred embodiments of the invention are set forth in the dependent claims.

The invention is based on transferring data related to the voice connection of a wireless terminal through a first radio access gateway managing the voice connection of the terminal, even though a base station connected to a new, second radio access gateway started to provide a wireless connection to the terminal after a handover. For this purpose, address data of the second radio access gateway is defined in the first radio access gateway when it is detected that handover is needed for the terminal to the base station connected to the second radio access gateway. Address data of the first radio access gateway is also defined in the second radio access gateway. Data addressed to the terminal and transmitted from it is transferred through the first and second radio access gateway when the handover has been performed to the base station connected to the second radio access gateway.

The method and system of the invention provide the advantage that a base station connected to different radio access gateways can be changed in such a manner that the voice connection provided for the wireless terminal remains substantially intact. The other termination point of a voice over IP connection does not notice the change in the radio access gateway caused by the base station handover. This way, the termination point apparatuses according to the used voice over IP protocols do not require any changes.

According to a preferred embodiment of the invention, the second radio access gateway also takes care of protocol conversions between the wireless connection provided for the terminal and the voice over IP connection, if a handover is performed to a base station connected to the second radio access gateway. This provides the advantage that the protocol conversion is in its entirety performed in the second radio access gateway, in which case known voice over IP conversion solutions can be used in the second radio access gateway.

BRIEF DESCRIPTION OF THE FIGURES

In the following, the invention will be described by means of the preferred embodiments and with reference to the attached drawings in which.

DETAILED DESCRIPTION OF THE INVENTION

The invention can be applied to any wireless telecommunications system which comprises radio access gateways providing voice over IP transmission.

Figure 1:
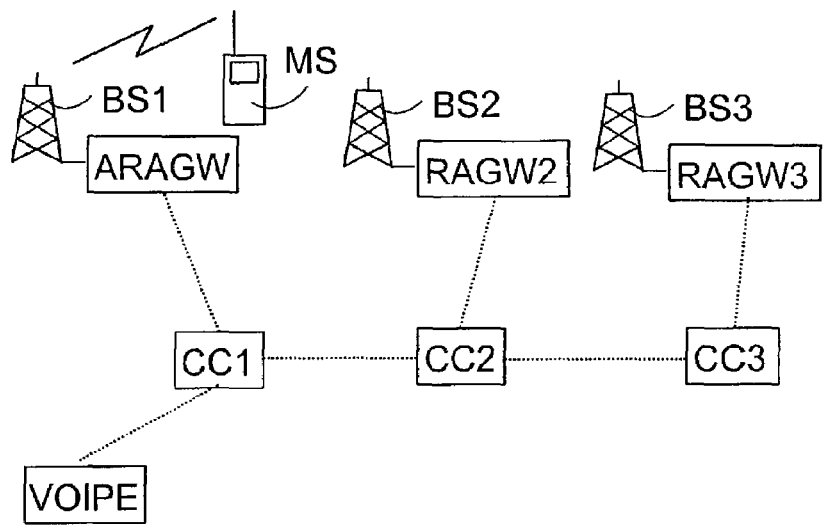
FIG. 1 shows a wireless telecommunications system providing voice over IP.

FIG. 1 shows in a simplified manner a wireless telecommunications system providing voice over IP taking into consideration only essential parts of the invention. The mobile station MS is a wireless terminal according to the GSM system, for instance, for which a voice connection is provided. A voice connection of a mobile station MS refers in this context to a speech transmission connection formed by a voice over IP connection established in an IP network and a wireless connection provided to a mobile station MS. A base station BS1, BS2, BS3 acts as a transceiver and communicates over the radio interface with several mobile stations MS belonging to its coverage area, i.e. cell. A certain number of base stations BS1 to 3 is connected to, i.e. associated with, a radio access gateway (ARAGW, RAGW2, RAGW3). Thus, the radio access gateways have a service area defined by the coverage areas of the base stations connected to them. In the example of FIG. 1, only one base station BS1 to 3 is connected to each radio access gateway ARAGW, RAGW2 to 3 for simplicity's sake.

The radio access gateway ARAGW, RAGW2 to 3 takes care of protocol conversion between voice over IP connections of an IP-based network and the wireless connections of the mobile stations MS provided by one or more base stations BS1 to 3 in its service area. Thus in the example of FIG. 1, IP-based data transmission (IP-based network) can be arranged between the radio access gateway and another VoIP entity VOIPE. The radio access gateway ARAGW, RAGW2 to 3 manages the actual voice over IP connection, i.e. performs the necessary conversions to the speech data received from the base station BS so that it can be transmitted to the VoIP entity VOIPE. VOIPE can, for instance, be a second VoIP gateway or a VoIP terminal. Radio access gateways typically have fixed IP addresses. The speech data received from the base station BS1 to 3 can be compressed, in which case the radio access gateway can perform decompression. The radio access gateway converts the speech data received from the base station BS1 to 3 according to the used voice over IP protocol for transmission to the IP network. If necessary, speech data in VoIP format can also be compressed to an 8 kbit/s format. Correspondingly, the radio access gateway converts the voice over IP into a data format transmittable to the base station BS1 to 3 and the base station BS1 to 3 transmits the data over the radio interface to the mobile station MS.

Call control entities CC1, CC2, CC3 control the operation of the radio access gateways and typically manage all signalling (shown as a dotted line in FIG. 1) related to voice over IP connections. The call control entities CC1 to 3 have an important role especially in connection establishment, i.e. they transmit connection establishment requests to and from the radio access gateways. In addition to establishing connections, the call control entities CC1 to 3 can, for instance, take care of address translation, admission control and bandwidth management, data, such as location data, updating for mobile stations MS and billing. Each radio access gateway ARAGW, RAGW2 to 3 registers with the call control entity CC1 to 3 so that the speech data of the mobile stations MS can be converted into voice over IP, and vice versa, in the radio access gateway.

FIG. 1 shows a call control entity CC1 to 3 for each radio access gateway, but it should be noted that one call control entity can also control several radio access gateways. The call control entities CC1 to 3 can also, depending on the network, communicate with the central element of the telecommunications system. This central element is, for instance, in a GSM system a mobile switching centre MSC or in a GPRS (General Packet Radio System) system a serving GPRS support node SGSN.

According to a preferred embodiment of the invention, the first radio access gateway acts as an anchor radio access gateway ARAGW during the voice connection provided to a mobile station MS. This means that the mobile station MS can, if necessary, be handed over to a base station connected to a second radio access gateway. A wireless connection can be provided to the mobile station MS in the service area of the second radio access gateway RAGW2, in which case a radio channel is allocated to the mobile station MS from the base station connected to the second radio access gateway RAGW2. After the handover is performed, the radio access gateway is changed, i.e. the data related to the voice connection of the mobile station MS is transmitted between the base station and the IP network through the new, second radio access gateway. The essential thing is that the data is, however, still transmitted through the anchor radio access gateway ARAGW, which means that from the viewpoint of the voice over IP entity VOIPE, the termination point does not change.

Figures 2A, 2B:
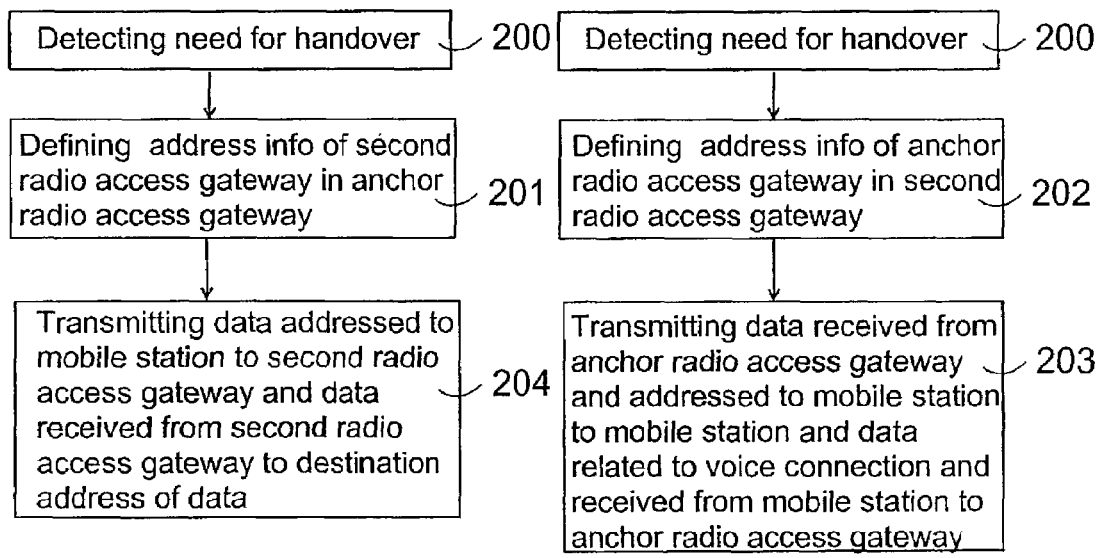
FIGS. 2a and 2b show flow charts of a radio access gateway change.

FIGS. 2a and 2b illustrate this idea from the viewpoint of different radio access gateways: a voice connection is established between the first radio access gateway ARAGW and the mobile station MS, whereby the first radio access gateway ARAGW becomes the anchor radio access gateway. A wireless connection transmitting speech information is established between the mobile station MS and ARAGW through a base station BS1 connected to ARAGW. The voice over IP connection between ARAGW and the voice over IP entity VOIPE can be established according to the signalling arrangement of the used voice over IP standard.

FIG. 2a shows functions related to the anchor radio access gateway ARAGW and FIG. 2b shows functions related to the second radio access gateway RAGW2. When a need for a handover to a base station BS2, which is connected to the second radio access gateway RAGW2, is detected 200, the management of the wireless connection needs to be changed to the second radio access gateway RAGW2. Address information of the second radio access gateway RAGW2 is then defined 201 in the anchor radio access gateway ARAGW. Address information of ARAGW is defined 202 in the second radio access gateway RAGW2.

When the mobile station MS moves on to be managed by the base station BS2 connected to the second radio access gateway RAGW2, data addressed to and transmitted from the mobile station MS is transmitted 203, 204 through the first radio access gateway ARAGW and the second radio access gateway RAGW2. RAGW2 can then transmit 203 data received from the mobile station MS and related to its voice connection to ARAGW and data received from ARAGW and related to the voice connection of the mobile station MS to the mobile station MS. ARAGW can, for its part, transmit 204 data addressed to the mobile station MS to the second network element RAGW2 and data received from RAGW2 and related to the voice connection of the mobile station MS to its destination address.

When voice over IP is transmitted through the anchor radio access gateway ARAGW, the second termination point (VOIPE) can still communicate during the entire connection with the original radio access gateway and call control entity. This way, the used radio access gateway can be changed without any changes to the already known voice over IP protocols or voice over IP terminals. In addition, the operation of the firewalls possibly existing between the termination point and the anchor radio access gateway is more stable, because the addresses need not be changed.

As assumed in the following description, the second radio access gateway RAGW2 preferably performs all protocol conversions between the wireless voice connection and the voice over IP connection after the handover. It is also possible that ARAGW continues converting to some extent, but ARAGW cannot do it entirely, because it does not have a connection to the new base station BS2. A safer solution is to transmit the data in voice over IP format without conversion between the anchor radio access gateway ARAGW and the second radio access gateway RAGW2.

The actual signalling related to changing the radio access gateway is transmitted through the call control entities CC1 to 3. Call control entities CC1 to 3 preferably comprise configuration information on radio access gateways, base stations belonging to the radio access gateways and call control entities controlling the radio access gateways. According to a preferred embodiment, the call control entity CC1 of the anchor radio access gateway ARAGW makes a decision on the need to change the radio access gateway on the basis of the information received from ARAGW and the configuration information.

A call control entity CC1 to 3 according to a preferred embodiment comprises means for negotiating a connection between the radio access gateway it manages and the second radio access gateway, if CC1 to 3 detects a need for handover to a base station connected to the second radio access gateway. This comprises typically at least the transmission of the address information of the radio access gateways. The anchor radio access gateway comprises means for routing, for instance by tunnelling, received packets addressed to the mobile station to the second radio access gateway handling the protocol conversion. The radio access gateway handling the protocol conversion comprises means for routing packets transmitted from the mobile station MS to the anchor radio access gateway. Transmission of voice over IP data between ARAGW and RAGW2 can be done by any transport mechanism used in an IP network, typically by utilising an RTP protocol (Real-time Transport Protocol). The gateways ARAGW, RAGW2 to 3 and the call control entities CC1 to 3 comprise processors controlling their operation, and memory. The functionality illustrated in FIG. 2 can preferably be implemented by program in the processors, or if necessary, integrated circuits can be used.

Figure 3:
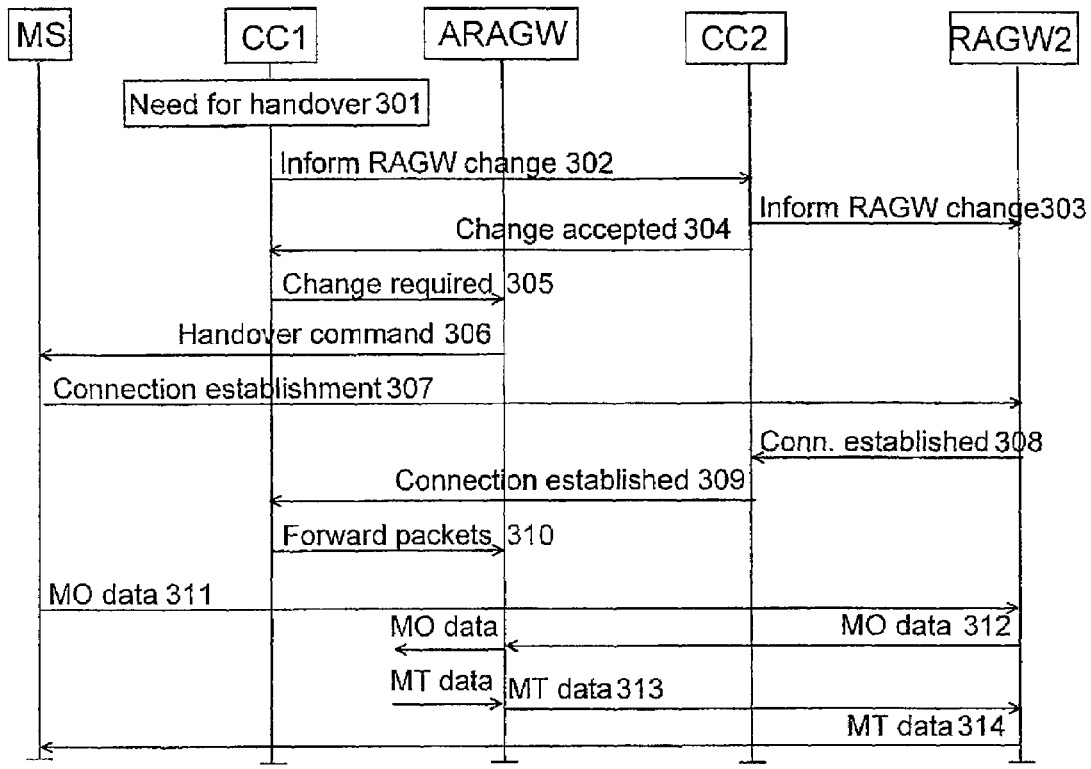
FIG. 3 illustrates in greater detail the radio access gateway change in a signalling diagram.

FIG. 3 shows by way of example and in greater detail how MS is changed during an active voice connection from the anchor radio access gateway ARAGW to the second gateway RAGW2, which have separate call control entities CC1 and CC2. The call control entity CC1 of the anchor radio access gateway ARAGW checks on the basis of information received from the radio access gateway whether it is necessary to have the protocol conversion of the mobile station MS done by another radio access gateway. When ARAGW detects that there is a need to handover to a new base station BS2, information on this is transmitted to the call control entity CC1. CC1 detects preferably on the basis of configuration information and the handover information received from ARAGW that a need exists for a handover 301 to the base station BS2 connected to the second radio access gateway RAGW2. CC1 defines a second call control entity CC2 controlling RAGW2 and informs 302 (Inform RAGW change) CC2 of the necessary change of radio access gateway. CC2 forwards 303 the information on the need for a handover to the radio access gateway RAGW2, after which the address information of the anchor radio access gateway ARAGW can be defined in the second radio access gateway RAGW2: At this time, it is preferably checked whether a wireless connection can be established to the mobile station MS in the area of RAGW2 and whether the protocol conversion related to the voice connection of MS can, for RAGW2's and CC2's part, be transferred to be done by RAGW2. If MS can be served, RAGW2 can already allocate the necessary resources for the new connection. If the mobile station MS can be served in the area of RAGW2, CC2 transmits 304 (Change accepted) information on this to the call control entity CC1. At this stage, the information necessary for connection establishment to the base station BS2 and on to the radio access gateway RAGW2 is preferably also transmitted.

CC1 transmits 305 (Change required) information to the anchor radio access gateway ARAGW on changing the radio access gateway to RAGW2, after which the address information on the second radio access gateway RAGW2 can be defined in ARAGW. The signalling related to the radio access gateway change described above comprise TSAP (Transport Service Access Point) addresses related to ARAGW and RAGW2. A TSAP address contains an IP address and a port number.

The anchor radio access gateway ARAGW transmits 306 (Handover command) to the mobile station MS a command to handover to a base station connected to the second radio access gateway RAGW2. This message comprises the necessary information for MS to request a handover to the base station BS2. A connection is established 307 (Connection establishment) through the base station BS2 between the mobile station MS and the second radio access gateway RAGW2 on the basis of the information received from ARAGW. Thus, a handover has been performed, i.e. a wireless connection is handed over to RAGW2 and BS2.

When the connection has been established between the mobile station MS and the second radio access gateway RAGW2, RAGW2 transmits 308 (Conn. established) information on the establishment to the call control entity CC2 which then transmits 309 (Connection established) information on the establishment to the call control entity CC1. CC1 transmits 310 (Forward packets) to the anchor radio access gateway ARAGW an instruction to release the connection provided to the mobile station MS through the base station BS1 and an instruction to start transmitting data belonging to the connection of the mobile station MS to RAGW2. After this, ARAGW starts transmitting 313 data (MT data) addressed to the mobile station MS to the second radio access gateway RAGW2. RAGW2 converts the voice over IP connection data received from ARAGW into the correct format for a wireless connection depending on the wireless network in question (for instance into speech frames of the GSM system) and transmits 314 the data to the mobile station MS. RAGW2 converts the data 311 (MO data) related to the voice connection and received from the mobile station MS into a data format according to the used voice over IP protocol and transmits the converted data to the anchor radio access gateway ARAGW 312.

According to an embodiment, ARAGW can also start to transmit data to RAGW2 after receiving a message 305 as soon as ARAGW has received the first packets from RAGW2. In this case, a separate instruction 310 from CC1 is not required. In the example described above, the radio access gateways ARAGW and RAGW2 have separate call control entities CC1 and CC2, but they can also be controlled by the same call control entity.

According to a preferred embodiment of the invention, the anchor radio gateway ARAGW transmits data related to the connection during the entire duration of the logical voice connection. If the connection is switched several times to different radio access gateways, i.e. several handovers are made, according to a preferred embodiment, the radio access gateway managing the connection to the mobile station MS at each time is arranged to be in contact directly with the anchor radio access gateway ARAGW. Thus, the data addressed to and transmitted from the mobile station is transmitted through the anchor radio access gateway ARAGW and a new radio access gateway managing the wireless connection to the mobile station at each time. Signalling with the VoIP entity VOIPE related to the connection is also preferably managed through the call control entity CC1 of the anchor radio access gateway ARAGW.

Figure 4:
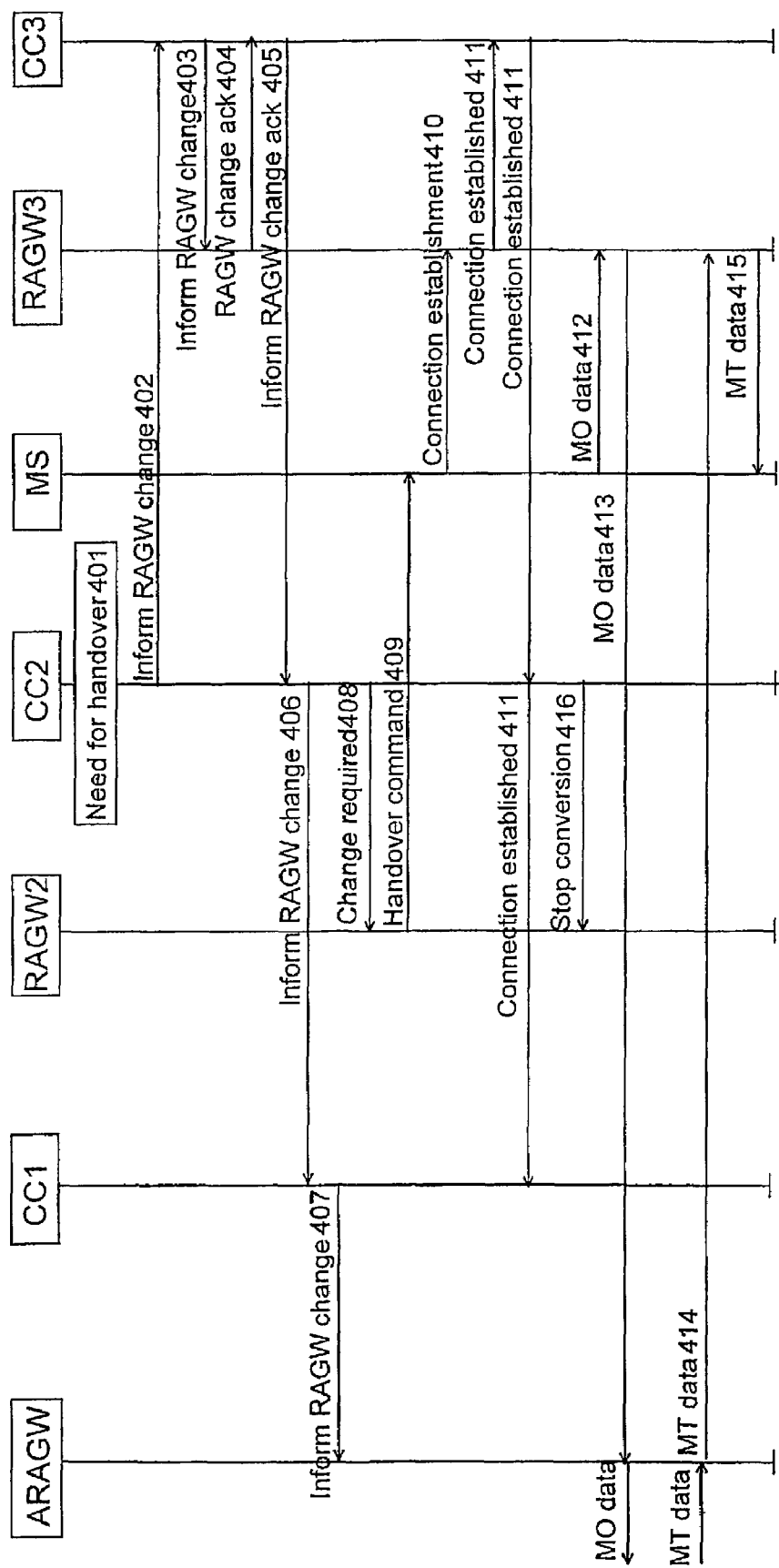
FIG. 4 illustrates a second change of the radio access gateway.

FIG. 4 illustrates a situation where the radio access gateway RAGW2 managing the wireless connection of the mobile station MS and preferably taking care of protocol conversion, which has already been changed once, needs to be changed again. The wireless connection needs to be changed and the management of protocol conversions is preferably changed to be taken care of by a new, third radio access gateway RAGW3, if the mobile station MS needs a handover to a base station BS3 connected to RAGW3. The call control entity CC2 of the radio access gateway RAGW2 managing the wireless connection of the mobile station MS detects 401 (Need for handover) preferably on the basis of information received from RAGW2 that a handover is needed to a base station BS3 connected to the third radio access gateway RAGW3. CC2 transmits 402 (Inform RAGW change) information on the required radio access gateway change to the call control entity CC3. The call control entity CC3 then informs 403 (Inform RAGW change) the radio access gateway RAGW3. After this, the address information of the anchor radio access gateway ARAGW can be defined in the third radio access gateway RAGW3. If the mobile station MS can be served in the area of RAGW3 on the basis of an acknowledgement 404 (RAGW change ack) received from RAGW3, CC3 transmits 405 (Inform RAGW change ack) an acknowledgement to CC2 on the success of the change. CC2 can then transmit 406 (Inform RAGW change) information on the required radio access gateway change to the call control entity CC1. CC1 transmits 407 (Inform RAGW change) information on this to the anchor radio access gateway ARAGW, after which the address information of the third radio access gateway RAGW3 can be defined in it (the address information comprising TSAP information received from RAGW3 preferably in message 404). ARAGW can then be set to also wait packets from RAGW3.

CC2 transmits 408 (Change required) information on the change of the radio access gateway to the radio access gateway RAGW2 managing the wireless connection. RAGW2 transmits 409 (Handover command) a command to the mobile station MS on making a handover to a base station connected to the third radio access gateway RAGW3. A wireless connection is established 410 (Connection establishment) between the mobile station MS and the third radio access gateway RAGW3 through the base station BS3 on the basis of the information received from ARAGW. After the connection has been established between the mobile station MS and the third radio access gateway RAGW3, CC3 transmits 411 (Connection established) information on the establishment to the call control entities CC2 and CC1.

RAGW3 preferably performs protocol conversion, i.e. after connection establishment (410) converts data 412 (MO data) received from the mobile station MS into the format of the used voice over IP protocol and transmits the converted data to the anchor radio access gateway ARAGW 413. ARAGW transmits the data received from RAGW3 onwards. Because RAGW3's information has already been defined in ARAGW, ARAGW can immediately after having received the first packets (413) from RAGW3 start to transmit 414 (MT data) data addressed to the mobile station MS to the third radio access gateway RAGW3. It is also possible to use a separate instruction message, as in FIG. 3 (310). RAGW3 converts the data it has received from ARAGW into a correct format and transmits 415 the data to the mobile station MS. This way, the handover becomes as unnoticeable as possible to the user. Correspondingly, CC2 can transmit 416 (Stop conversion) to RAGW2 a command to stop the protocol conversion of the voice connection of the mobile station MS and to release the connection to the mobile station MS.

When the voice connection provided to the mobile station MS is released, it is also possible to remove settings made to the anchor radio access gateway ARAGW and any settings made to the radio access gateway managing the wireless connection.

According to a preferred embodiment of the invention, voice over IP transmission is performed according to the H.323 standard. The protocol conversion performed by the radio access gateway (ARAGW, RAGW2 to 3) is preferably done in such a manner that speech data according to the wireless telecommunications network in question and transmitted at least through a base station (BS1 to 3) from the mobile station MS is converted into H.323 format and correspondingly, H.323-format speech data is converted into the format of the wireless telecommunications network.

The functionality of the radio access gateways ARAGW, RAGW2 to 3 described above can be implemented in a gateway defined in the H.323 standard. The functionality of the call control entities CC1 to 3 can be implemented in gatekeepers according to the H.323 standard. The gatekeepers have a certain zone, and a gatekeeper controls the H.323 gateways, H.323 terminals, multipoint control units (MCU) belonging to the zone as well as their connection management.

The H.323 standard comprises several protocols. A reliable or non-reliable-transmission protocol, typically TCP (Transmission Control Protocol) or UDP (User Datagram Protocol), is run on top of the IP network protocol depending on the application. RTP/RTCP (Real-time Transport Control Protocol) does the packaging and synchronisation of media streams/control data over a packet-switched network. The H.225 protocol takes care of the tasks related to connection establishment in particular, based on the Q.931 signalling. The H.245 protocol defines conference control and capability exchange messages. The H.225 protocol contains definitions of RAS (Registration, Admissions and Status) messages used in finding gatekeepers or in registration, and Q.931 messages used mainly in connection establishment between termination points. These messages can be utilised in signalling information related to the change of a radio access gateway illustrated in FIGS. 3 and 4. For instance, the "Facility" message is well suited for this purpose. It is also possible to utilise the H.245 protocol or a completely new protocol in signalling a radio access gateway change. Data transmission between radio access gateways ARAGW, RAGW2 to 3 and related to a mobile station MS connection can preferably be done by establishing a H.323 connection between them.

One embodiment of the invention uses the SIP protocol in voice over IP transmission. The SIP protocol defines terminals and their properties, manages connection establishment negotiations, data transmission and connection release. The parties are identified on the basis of their SIP addresses which are in URL (Uniform Resource Locator) format. Many SIP protocol messages are text-based and based on the HTTP protocol (HyperText Transfer Protocol). The functionality of the radio access gateways (ARAGW, RAGW2 to 3) described earlier can be implemented in SIP user agents. The functionality of the call control entities (CC1 to 3) described earlier can be implemented in SIP servers or SIP proxy servers described in the SIP standard and the information related to radio access gateway change can be transmitted by utilising SIP messages.

The invention can also be applied to the H.248 standard, in which case the functionality of the radio access gateways (ARAGW, RAGW2 to 3) described earlier can be implemented as part of a H.248 media gateway. The functionality of the call control entities (CC1 to 3) can be implemented as part of a H.248 media gateway controller.

Figure 5:
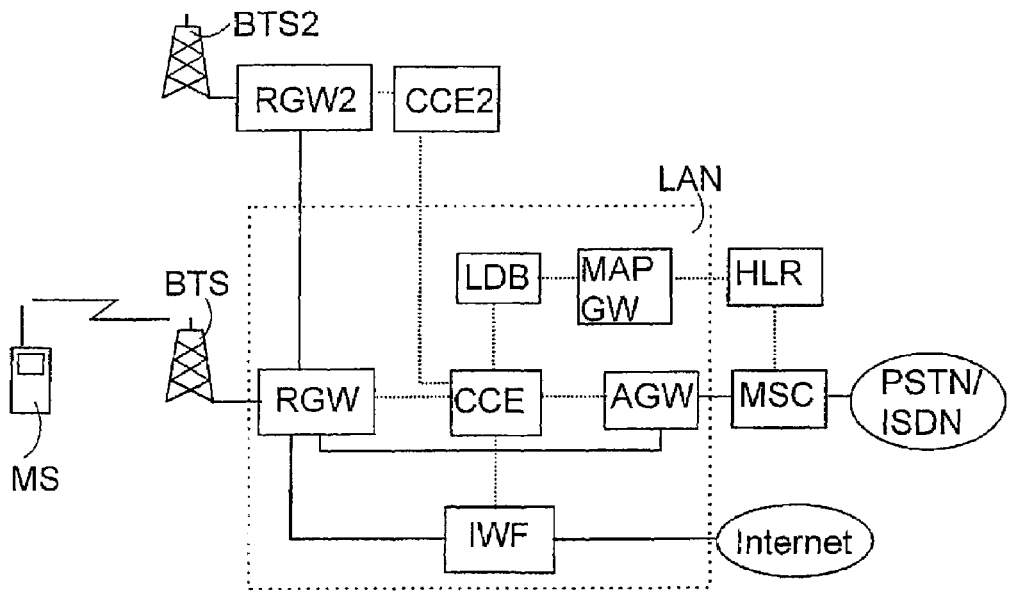
FIG. 5 shows in greater detail a wireless telecommunications system providing voice over IP.

FIG. 5 shows in more detail a wireless telecommunications system providing voice over IP. The system shown in FIG. 5 is based on the GSM system, to which an IP-based local area network LAN has been added. The mobile station MS can be a terminal fully according to the GSM standard and it communicates with a GSM base transceiver station BTS. BTS is connected to a radio access gateway RGW based on a H.323 gateway, for instance. RGW takes care of the necessary signalling conversions and data conversions between the base transceiver station BTS and the used local area network LAN. RGW also makes decisions on handovers between base transceiver stations BTS (handover management) and controls the base transceiver station BTS and consequently, the radio network and resources. The base transceiver station BTS sees RGW as a base station controller BSC of the GSM system.

A call control entity CCE of a wireless network does call control and mobility management for mobile stations MS visiting the areas of the RGWs belonging to its area. CCE takes care of address conversion functions and collects call data records. CCE also acts as an interface to network operation and maintenance O&M managed by an O&M server (not shown in FIG. 5). CCE can grant rights to allocate data transmission resources to a mobile station MS by utilising a location database LDB. LDB takes care of various directory services, such as maintenance of information specific to a mobile station and a subscriber and transmission of the information to CCE, if necessary. LDB also maintains location updates of mobile stations MS and collects billing information from CCE. LDB is typically also connected to a home location register HLR of the GSM network through a MAP (Mobile Application Part) protocol gateway MAPGW.

The call control entity CCE has a connection to an A-interface gateway AGW which takes care of the conversion of data (speech or data stream) and signalling between the local area network and the mobile switching centre MSC of the GSM network. This way, it is possible to establish a data transmission connection between RGW and the GSM network and communicate with PSTN/ISDN networks. IP-based data transmission and reception can be managed by RGW through an interworking function IWF to external IP-based networks, such as the Internet. IWF takes care of the necessary conversions in data transmission between the local area network LAN and external networks.

When linking the radio access gateways ARAGW, RAGW2 to 3 according to the above description to the system in FIG. 5, their functionality can be implemented as part of RGW. In such a case, RGW does the protocol conversion between the GSM speech transmission and voice over IP according to the H.323 protocol, for instance. The above-mentioned functionality of the call control entities CC1 to 3 controlling the radio access gateways and voice over IP connections is preferably a part of the call control entity CCE. So as to be able to support the mobility of mobile stations MS between radio access gateways RGW, RGW2 belonging to different call control entities, a signalling connection can be established between the call control entities CCE and CCE2. The VoIP entity VOIPE shown in FIG. 1 can, for instance, be AGW, in which case VoIP data can be converted into a speech stream according to the A-interface and transmitted on to another GSM network, ISDN network, or PSTN network.

In the system shown in FIG. 5, a need to change the used radio access gateway may arise when MS switches over to the base transceiver station BTS2 connected to a different radio access gateway (RGW2). RGW decides on a handover to the new base station and the call control entity CCE preferably detects that there is also a need to change the radio access gateway. At this point, CCE and CCE2 negotiate on changing the radio access gateway and transmit the necessary information to the radio access gateways RGW and RGW2. Because RGW(2) emulates the base station controller BSC of the GSM system and the handover process of the GSM system is well known for instance from the book "The GSM System for Mobile Communications", M. Mouly and M. Pautet, Palaiseau, France, 1992, ISBN:2-9507190-0-7, the actual handover process need not be described in greater detail in this application. When the connection to the new base transceiver station BTS2 has been established, data transmission can be arranged between the radio access gateways RGW and RGW2.

It should be noted that the scope of application of the invention is in no way limited to the system shown in FIG. 5, but can also be utilised for instance in conventional GSM/GPRS systems, UMTS systems or in systems based on different WLAN standards. It is obvious to a person skilled in the art that while technology advances, the basic idea of the invention can be implemented in many different ways. The invention and its embodiments are thus not restricted to the examples described above, but can vary within the scope of the claims.

The invention claimed is:

1. A method of transferring voice over IP (VoIP) in a wireless telecommunications system comprising at least one wireless mobile station, a first radio access gateway and a second radio access gateway, in which system a wireless connection is provided to the mobile station through a base station connected to said first radio access gateway, and said first radio access gateway is configured to perform protocol conversion between the provided wireless connection and a voice over IP connection established for the mobile station in an element of an IP-based network, the method comprising:

defining in said first radio access gateway the address information of said second radio access gateway in response to detecting a need to hand over the wireless connection of the mobile station to a base station connected to said second radio access gateway, defining in said second radio access gateway the address information of said first radio access gateway, transmitting data addressed to and transmitted from the mobile station through said first radio access gateway and said second radio access gateway in response to the handover to the base station connected to said second radio access gateway, wherein said first radio access gateway is controlled by a first call control entity and said second radio access gateway being controlled by a second call control entity, the first and second call control entity comprise configuration information on radio access gateways, base stations connected to radio access gateways and call control entities controlling radio access gateways, said second radio access gateway and second call control entity are defined on the basis of the configuration information in the first call control entity in response to having detected a need for handover to a base station connected to said second radio access gateway on the basis of information received from said first radio access gateway, information on the need for radio access gateway change is transmitted from the first call control entity to the second call control entity, the address information of the second radio access gateway is defined in said first radio access gateway and the address information of the first radio access gateway is defined in said second radio access gateway, a handover command for establishing a connection to a base station connected to said second radio access gateway is transmitted from said first radio access gateway to the mobile station, a connection is established between the mobile station and said second radio access gateway, information on the connection establishment is transmitted through the first and second call control entity to said first radio access gateway, and data addressed to and transmitted from the mobile station is transmitted through said first radio access gateway and said second radio access gateway.

2. A method as claimed in claim 1, the method further comprising: performing protocol conversion between the wireless connection provided to the mobile station and the voice over IP connection in said second radio access gateway in response to the handover to the base station connected to said second radio access gateway.

3. A method as claimed in claim 1, wherein said first control entity and said second control entity are combined into a single control entity.

4. A method as claimed in claim 1, the method further comprising:

defining in said first radio access gateway the address information of a third radio access gateway in response to having detected a need to hand over the mobile station from the base station of said second radio access gateway to a base station connected to said third radio access gateway, defining in said third radio access gateway the address information of said first radio access gateway, and transferring data addressed to and transmitted from the mobile station through said first radio access gateway and said third radio access gateway in response to the handover to the base station connected to said third radio access gateway.

5. A method as claimed in claim 1, wherein the voice over IP connection is arranged with one of the following protocols: H.323, SIP (Session Initiation Protocol) or H.248.

6. A method as claimed in claim 1, wherein said mobile station is a GSM mobile station, and said radio access gateways are configured to perform protocol conversion between speech transmission according to the GSM system and voice over IP.

7. A wireless telecommunications system comprising at least one wireless mobile station, a first radio access gateway and a second radio access gateway, wherein the wireless telecommunications system is configured to provide a wireless connection to the mobile station through a base station connected to said first radio access gateway, said first radio access gateway is configured to perform protocol conversion between the wireless connection provided to the mobile station and a voice over IP connection established for the mobile station in an element of an IP-based network, the wireless telecommunications system is configured to define the address information of said second radio access gateway in said first radio access gateway in response to having detected a need to hand over the wireless connection of the mobile station to a base station connected to said second radio access gateway, the wireless telecommunications system is configured to define the address information of said first radio access gateway in said second radio access gateway, said first radio access gateway and said second radio access gateway are configured to transfer data addressed to and transmitted from the mobile station through said first radio access gateway and said second radio access gateway in response to the handover to the base station connected to said second radio access gateway, wherein said first radio access gateway and said second radio access gateway are controlled by one or more call control entities which are configured to detect a need for handover on the basis of information received from said first radio access gateway and to transmit the necessary address information to said first radio access gateway and said second radio access gateway.

8. A telecommunications system as claimed in claim 7, wherein said second radio access gateway is configured to perform protocol conversion between the wireless connection provided to the mobile station and the voice over IP connection in response to the handover to the base station connected to said second radio access gateway.

* * * * *